United States Patent [19]

MacLean et al.

[11] Patent Number: 4,978,071
[45] Date of Patent: Dec. 18, 1990

[54] NOZZLE WITH THRUST VECTORING IN THE YAW DIRECTION

[75] Inventors: Malcolm K. MacLean, Mason; Mark E. Daniels, Hamilton, both of Ohio

[73] Assignee: General Electric Company, Cincinnati, Ohio

[21] Appl. No.: 336,405

[22] Filed: Apr. 11, 1989

[51] Int. Cl.$^5$ ............................................... F02K 1/12
[52] U.S. Cl. ........................ 239/265.19; 239/265.35; 239/265.41; 244/23 D; 244/52
[58] Field of Search .................. 239/265.19, 265.33, 239/265.35, 265.37, 265.39, 265.41; 60/228, 232, 271; 244/12.5, 23 D, 52, 110 B

[56] References Cited

U.S. PATENT DOCUMENTS

| | | | |
|---|---|---|---|
| 3,666,044 | 5/1972 | Killian | 239/265.19 |
| 3,981,451 | 9/1976 | Prior et al. | 239/265.33 |
| 4,128,208 | 12/1978 | Ryan et al. | 239/265.39 |
| 4,176,792 | 12/1979 | McCardle, Jr. | 239/265.41 |
| 4,219,156 | 8/1980 | Schwaerzler | 239/265.35 |
| 4,245,787 | 1/1981 | Freid | 239/265.41 |
| 4,363,445 | 12/1982 | Bouiller et al. | 239/265.35 |
| 4,456,178 | 6/1984 | Jones et al. | 239/265.39 |
| 4,508,270 | 4/1985 | Joubert | 239/265.35 |
| 4,575,006 | 3/1986 | Madden | 239/265.29 |
| 4,848,664 | 7/1989 | Thayer | 239/265.35 |

OTHER PUBLICATIONS

Popular Science, Feb. 1989, X-31 Fighter, Thrust Vectoring of Pitch and Yaw Plane by Deflection of Exhaust, X—31A Aircraft.
ISABE 87-7061, "Thrust Vectoring—Why and How?", Dr. W. B. Herbst, Thrust Vectoring of Pitch and Yaw Plane by Deflection of Exhaust, X-31A Aircraft.

Primary Examiner—Andres Kashnikow
Assistant Examiner—Christopher G. Trainor
Attorney, Agent, or Firm—Jerome C. Squillaro

[57] ABSTRACT

A vectorable gas turbine engine exhaust nozzle including deployable angled flow deflectors for providing thrust vectoring in the yaw direction. In one embodiment the deflectors are pivotally deployed in the diverging section of a two dimensional nozzle with the use of either electromechanical or pneumatic rotary actuators. The deflectors are preferably employed in a two dimensional convergent divergent exhaust nozzle which includes a means for varying the size of the throat and a means for providing pitch thrust vectoring.

7 Claims, 3 Drawing Sheets

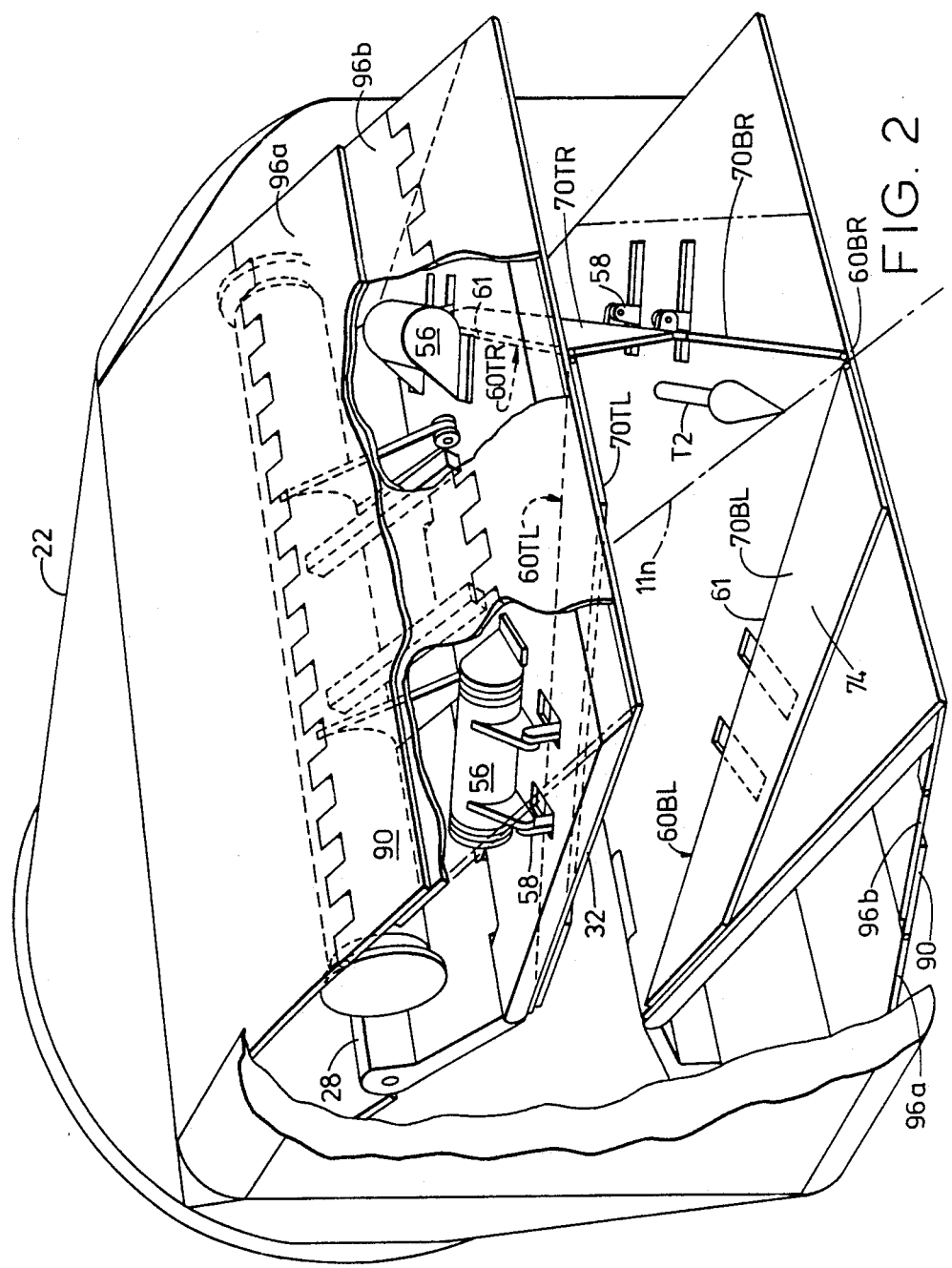

NOZZLE WITH THRUST VECTORING IN THE YAW DIRECTION

The Government has rights in this invention pursuant to Contract No. F33615-85-C-3001 awarded by the Department of the Air force.

BACKGROUND OF THE INVENTION

1. Field of the Invention

This invention relates to vectorable exhaust nozzles and particularly to a new and improved exhaust nozzle which is effective for providing thrust vectoring in the pitch and yaw directions.

2. Description of the Prior Art

Aircraft designers and particularly those designing high speed highly maneuverable military aircraft are constantly seeking better ways for controlling the aircraft and increasing its maneuverability in flight. The improvements are needed for anti-aircraft missle avoidance and other combat maneuvers. Additionally aircraft designers are trying to improve short take off and landing capabilities of aircraft. Exhaust systems, particularly for modern, high speed, military aircraft, have been adapted to provide a high degree of maneuverability over a wide variety of flight conditions including altitude, speed and Mach number while maintaining cruise efficiency.

Aircraft maneuverability may be provided by aircraft control surfaces such as wing flaps or ailerons or rudders. These means however are somewhat limited in their effectiveness because of large differences in operational flight conditions such as air speed. Thrust vectoring nozzles, though often more complicated, are more effective because they allow large thrust loads to be quickly applied in the pitch and yaw direction of the aircraft thereby providing the aircraft with enhanced maneuverability which is relatively independent of air speed.

In addition to flight maneuverability aircraft designers wish to optimize cruise efficiency which can be achieved through the use of a variable geometry exhaust nozzle on the gas turbine engine. A variable geometry nozzle permits the size of the nozzle's throat and the nozzle's exit to be changed in response to changes in flight conditions, such as air speed and altitude. Most exhaust nozzles for high speed aircraft employ a converging diverging exhaust nozzle. Converging diverging nozzles are well known in the field and generally means that the cross-sectional area of the exhaust nozzle in a downstream direction decreases to a position of minimum area, called the throat, and then increases to the downstream end or exit of the nozzle. Exhaust nozzles are often made variable through the use of a plurality of moveable nozzle sections in order to get a desired throat and exit areas. Nozzles capable of controlling the size of throat and exit are conventionally referred to as variable nozzles. Two dimensional convergent divergent nozzles are preferred because of the ease with which they can effect pitch control using the same positionable or variable flaps employed to maintain a desired throat and exit areas.

Current vectorable exhaust nozzle designs are limited as to the effectiveness of the thrust in the yaw direction. Though pitch can be effected by two dimensional flap control yaw is very difficult to provide in such a design. Suggested means for providing thrust vectoring of two-dimensional nozzles in the yaw direction include gimbaling the entire nozzle or pivoting split flaps in an axisymmetric manner to provide an aircraft pivoting moment. Such means have several drawbacks such as limited effectiveness, weight penalties and complexity, due to structural, kinematic, or aerodynamic constraints. Greater degrees of pivotal movement can be achieved by combining flaps with a gimbaled nozzle. However, such nozzles generally require complicated hardware and controls and are thus expensive and heavy.

In addition to the complexity of multi-directional vectored thrust nozzles there are problems integrating the nozzle with the aircraft. This in turn interferes with the nozzles operation and performance and also with the performance of the aircraft. In view of the above-mentioned problems, it is, therefore, an object of the present invention to provide gas turbine engines with improved means of vectoring the exhaust gas flow or thrust of an aircraft gas turbine engine.

It is another object of the present invention to provide a pitch vectorable nozzle with means of yaw vectoring.

Yet another object of the present invention to provide a pitch vectorable nozzle with means of yaw vectoring that does not significantly interfere with or adversely effect the performance of the aircraft, its gas turbine engine, or the engine's vectorable nozzle.

Another object of the present invention is to provide a variable geometry exhaust nozzle with thrust vectoring capability in the yaw direction.

Another object of the present invention is to provide a variable geometry pitch vectorable exhaust nozzle with pitch and yaw capability which is compact, simple in structure, and light weight.

One more object of the present invention is to provide a variable geometry pitch vectorable exhaust nozzle having yaw capability which is easily integrated into an aircraft.

Yet another object of the present invention is to provide a two dimensional convergent divergent (2DCD) variable geometry pitch vectorable exhaust nozzle with yaw capability.

SUMMARY OF THE INVENTION

The present invention, in accordance with one embodiment thereof, comprises a yaw vectoring means for vectoring the thrust of a gas turbine engine in the yaw direction, a means for stowing the yaw vectoring means in a substantially unobtrusive position with respect to the nozzle exhaust flow, and a means for deploying the yaw vectoring means at a deflecting angle to the unyawed flow within the divergent section of the exhaust nozzle.

The present invention, in accordance with one embodiment thereof, comprises an exhaust nozzle for a gas turbine engine which permits vectoring of the engine thrust in the yaw direction. The exhaust nozzle includes deflector flaps which are deployable into the flow at an angle to the undeflected flow plane within the divergent section of the exhaust nozzle.

The present invention, in accordance with a more particular embodiment thereof, comprises a two dimensional convergent divergent nozzle for a gas turbine engine which permits varying of the size of the exhaust nozzle throat area and vectoring of the engine thrust in the pitch and yaw directions. The exhaust nozzle comprises a set of upper and lower convergent flaps pivotally connected with a fixed structure of the exhaust nozzle and a set of upper and lower divergent flaps each of which are disposed downstream of and pivotally connected to the downstream end of a corresponding convergent flap. The exhaust nozzle includes a plurality of deflector flaps pivotally connected to corresponding divergent flaps and means for deploying the deflector flaps at an angle to the general direction unyawed flow within the divergent section of the exhaust nozzle.

In a more particular embodiment of the invention, the deflector flaps are hinged to the divergent flaps at an angle to the general direction of the unyawed flow along the divergent flaps, and the means for pivotally deploying the deflector flaps preferably comprise rotary actuators disposed on the cold side of the divergent flaps and suitable linkage to the deflector flaps.

The nozzle can include sidewalls and top and bottom walls. Fairing flaps are utilized to maintain smooth aerodynamic flow on the external sides of the flaps, and thrust reverser doors may be included for reversing engine thrust.

BRIEF DESCRIPTION OF THE DRAWING

This invention will be better understood from the following description taken in conjunction with the accompanying drawing, wherein:

FIG. 2 is a partial perspective view of the two dimensional convergent divergent exhaust nozzle including the convergent and divergent flaps and the deflector flaps and rotary actuators.

DESCRIPTION OF THE PREFERRED EMBODIMENT

Figure 1:
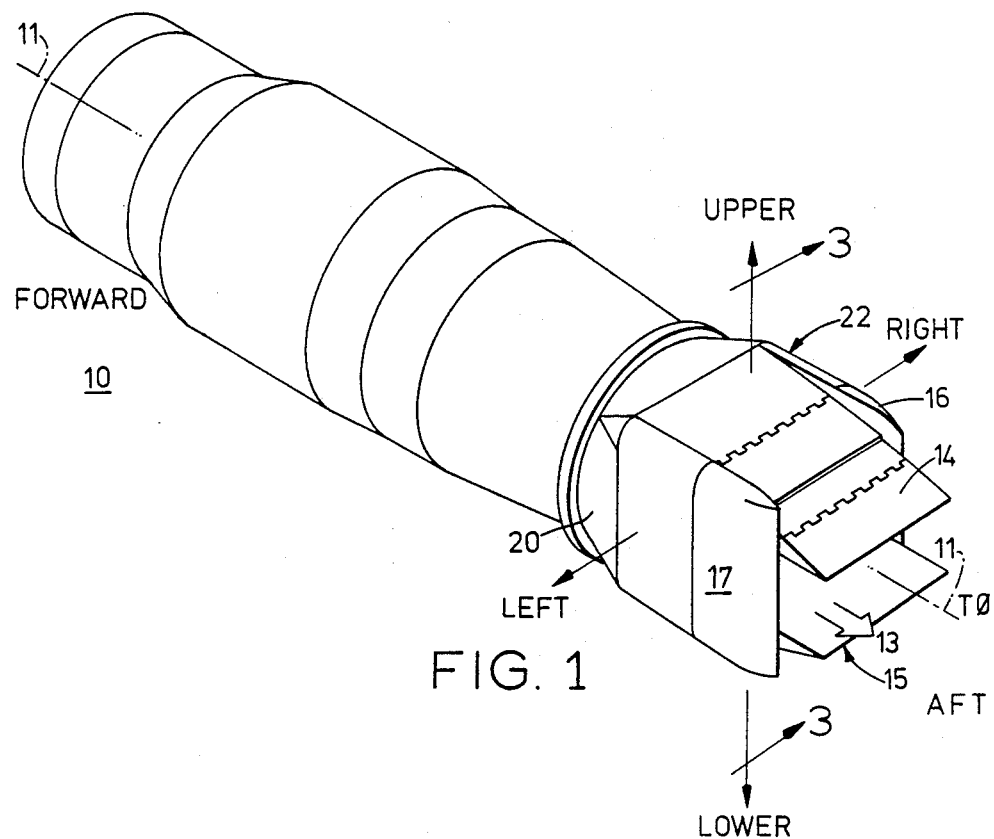
FIG. 1 is a diagramatic side view of a gas turbine engine including an exhaust nozzle incorporating features of the present invention.

Referring to FIG. 1, there is shown an aircraft gas turbine 10 engine having an engine centerline 11 incorporating a vectorable two dimensional converging diverging exhaust nozzle 22 connected to the remainder of engine 10 by a transition duct or section 20. The purpose of transition duct 20 is to convert the engine's exhaust flow from one having a circular cross section which is often referred to as an axisymmetric flow to one having a rectangular cross section or two dimension (2D) flow thereby permitting the design and use of mechanically simple and reliable two dimensional nozzle vectoring means in the pitch direction. At this point it is important to define the conventions used to describe the directions and frame of references for the flow, the movement of various exhaust nozzle elements such as flaps, the aircraft, and the engine. As shown in FIG. 1 directions forward and aft are toward the inlet and outlet respectively of engine 10 while left and right is conventionally shown as a person would define it when he is aft looking forward. Top and bottom are conventionally defined as above and below the engine centerline 11 respectively, as shown in FIG. 1. By way of example only, top flap assembly 14, bottom flap assembly 15, right sidewall 16, and left sidewall 17 are shown as examples of the nomenclature used herein to define direction and reference frame. Other conventions used herein include T and B for top and bottom and TL for top left, TR for top right, BL for bottom left, and BR for bottom right. Pitch and yaw are used to reference directions of the nozzle exhaust flow depicted by arrows 13 in FIG. 1 and aircraft thrust or direction, wherein pitch generally refers to a direction along a line from top to bottom often referred to as up and down. Yaw is perpendicular to both the pitch direction and engine centerline 11 thereby in a direction along a line running from left to right or as it is often referred to sideways. The exhaust nozzle 22 provides an exit for the exhaust gases 13 exiting engine 10 in the aft direction to which in turn produce thrust or a force which propels on the aircraft (not shown) to which the engine is attached. The exhaust nozzle 22 in FIG. 1 shows the nozzle in an unvectored position and therefore the exhaust gas direction T0 generally coincides with centerline 11. Although the preferred embodiment of this invention is described as being employed in a two-dimensional nozzle, it is to be understood that this invention can also be utilized in other embodiments, such as nozzles with triangular or trapezoidal cross sections.

Figure 3:
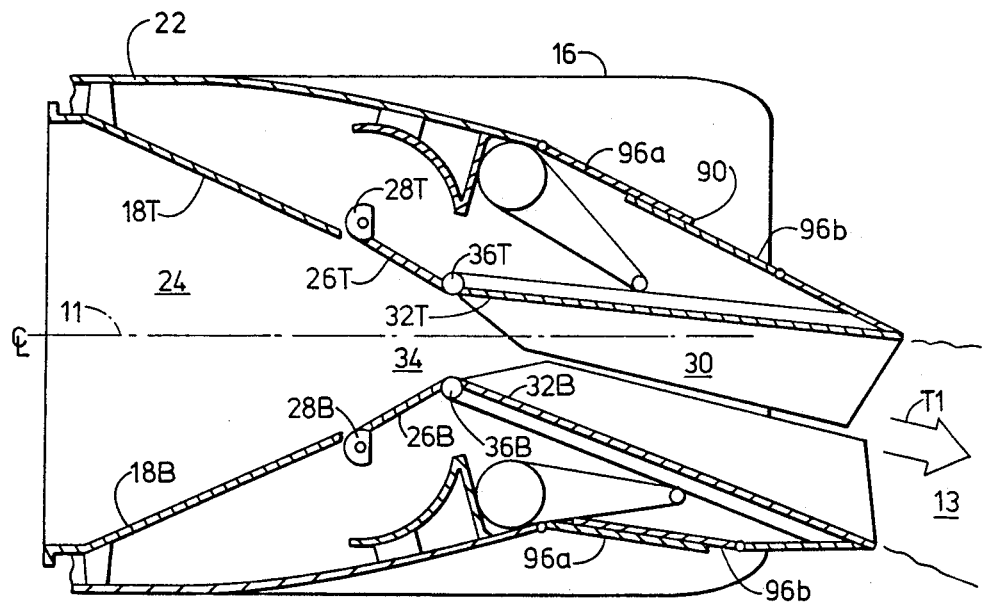
FIG. 3 is a cross sectional view of the gas turbine engine exhaust nozzle in FIG. 1.

Referring now to FIGS. 2 and 3, wherein exhaust nozzle 22 is shown in more detail and in the pitched and yawed position, nozzle 22 is broken up into three conventionally defined sections the convergent section 24, the divergent section 30, and a throat 34 therebetween. Convergent section 24 comprises a top wall 18T and a bottom wall 18B. Top wall 18T and the bottom wall 18B and sidewalls 16 and 17 are generally fixed structures. A "fixed structure" generally means a structure that is static, or fixed in place, relative to a reference, such as an aircraft wing fuselage, or engine casing. As will be discussed hereinafter, such fixed structures provide suitable mounts to which pivotable elements can be attached.

Top and bottom primary (or convergent) flaps 26T and 26B respectively are pivotally attached to the aft ends of top and bottom walls 18T and 18B by top and bottom first pivotal attachment means 28T and 28B respectively. The primary flaps are preferably pivotally positionable for enabling variation in the size of the nozzle throat 34. Top and bottom secondary (or divergent) flaps 32T and 32B are pivotally attached to the aft ends of top and bottom primary flaps 26T and 26B respectively by top and bottom second pivotal attachment means 36T and 36B respectively. The secondary flaps are preferably pivotally positionable for enabling variation in the size of the nozzle exit and for directing the exhaust flow in the pitch direction. Pivotal attachment means can be hinges or pins. The source of power may be mechanical, pneumatic, hydraulic, or electrical in nature. If a hinge or pin is used then one or more actuators may be used together with a mechanical linkage such as is known in the art and shown in U.S. Pat. No. 4,275,276 which is incorporated herein by reference. Each convergent and each divergent flap is shown in FIG. 2 as pivotable to selectable positions independently of any other convergent or divergent flap, thus enabling the nozzle throat and exit area to be selectively varied in size and the engine thrust to be vectored at a desired angle in the pitch direction.

As is shown in FIGS. 2 and 3, four deflector flaps 70TL, 70TR, 70BL, and 70BR, generally referred to herein as deflector flap 70, are pivotally mounted to their respective top and bottom secondary flaps by hinge 60 or some other suitable manner so that they can be deployed into the exhaust flow of the nozzle at selected angles to the direction of the exhaust flow T0 in FIG. 1 or alternatively T1 in FIG. 3, thereby providing a controllable thrust in the yaw or sideways direction providing a vectored thrust in the pitch and yaw direction as depicted by T2 in FIG. 2. The direction of the unyawed exhaust flow T1 generally coincides with the nozzle centerline 11n. A means of deploying each of the four deflector flaps 70 is shown in FIGS. 2 and 3 comprising a hinge 60 pivotally connecting deflector flap 70 to secondary flap 32 at an angle on the secondary flap to the exhaust flow direction or nozzle centerline 11n and a rotary actuator 56 which together with suitable mechanical linkage means 58 forms a relatively simple and reliable means for rotating the deflector flap 70 about its respective hingeline 61 which generally coincides with hinge 60 in the figures thereby turning or deflecting a portion of the exhaust flow and vectoring thrust in the yaw direction.

As can be seen from FIG. 2 each deflector flap and individual means of deployment is a mirror image of each other deflector flap and means of deployment. This generally symmetric system is particularly useful for use in single engine aircraft but may be modified or changed where conditions may be more suited to a side by side twin engine aircraft such as the F18 or F14. This arrangement permits an individual deflector flap to be deployed, either independently or in conjunction with another flap, independent of the position of either the convergent or divergent flaps. This capability is particularly useful for maneuvering the aircraft by simultaneously controlling in any combination the total thrust and its direction in both the pitch and yaw direction. This is accomplished by simultaneously controlling the area of throat 34 and the area of the nozzle exit, vectoring the thrust in the pitch direction by pivoting the secondary flaps 32, and in some embodiments primary flaps 26 also, and or vectoring the thrust in the yaw direction by deploying the deflector flaps 70.

Figure 4:
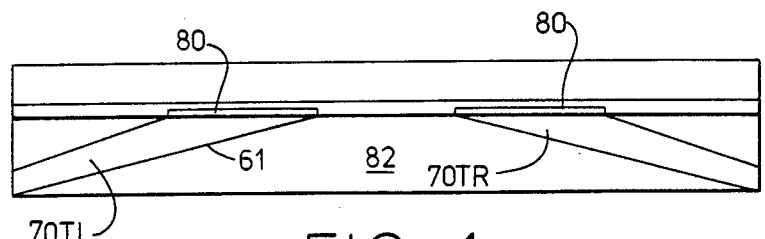
FIG. 4 is a rear view of the top divergent flap of the exhaust nozzle of FIG. 2 showing a first means of stowing the deflector flaps in an unobtrusive aerodynamically smooth manner.

As shown in FIG. 4, a recess 80 contoured to receive deflector flap 70 is provided to stow the deflector flap in order to provide a streamlined, continuous flowpath for exhaust gases across the inner surfaces of the divergent flaps 32T and 32B and minimize any disturbance to the exhaust flow from the deflector flaps 70 when they are not deployed and are in a stowed condition. Recess 80 having a depth about the thickness of deflector flap 70 thereby allows the stowage of deflector flap 70 so as to provide a generally continuous flush inner surface 80 on secondary flap 32.

In order to provide an aerodynamically clean or smooth surface for the airflow across the top and bottom of the Nozzle 10 3a, fairing means 90 is employing overlapping forward and aft fairing flaps 96a and 96b respectively as is best seen in FIGS. 2 and 3. Each fairing flap 96a and 96b is generally disposed outward of each convergent and divergent sections 24 and 30 respectively in overlapping engagement thereby allowing for variations in primary and secondary flap positions while still providing a relatively aerodynamically smooth surface for air passing above and below the nozzle 22. Various means of providing such fairings are shown in the art and an example is shown in the above referenced patent. One of the advantages of the present invention is that the means of producing the yaw thrust mechanically simple and structurally compact and therefore is easily covered by such an aerodynamic fairing means 90 thereby making the gas turbine engine 10 more efficient and providing protection for the various mechanisms of the pitch thrust vectoring means from being exposed to potentially damaging high velocity air flowing past the nozzle 22.

Each deflector flap 70 preferably has a size and shape that maximizes the deflecting surface 74 of deflector flap 70 but does not allow the upper and lower deflector flaps to overlap or interfere with each other at maximum deployment into the exhaust flow and a preselected or design chosen minimum opening between the top and bottom secondary flaps. Hence, as can be seen in FIGS. 2 and 3 deflector flaps 70 have a quadrilateral shape; i.e., 4 unequal sides.

The exhaust nozzle 22 operates as follows. Referring first to FIG. 2, the exhaust nozzle 22 is configured as a conventional two dimensional convergent divergent exhaust nozzle with the four deflector flaps 70 equipositioned, with respect to each flap, from the engine centerline 11. Furthermore, each deflector flap is angled along a hingeline 60 at a angle to the secondary flaps centerline 11N which generally coincides with the flow along its respective secondary flap 32. Each right hand or left pair of deflector flaps 70 are aligned equidistantly from the engine centerline 11 when the nozzle 22 is in the 0° angle of pitch mode. In this configuration, the exhaust gases exit the nozzle as depicted generally by the arrow T in the aft direction parallel to centerline 11 in FIG. 1. Engine thrust, which is directed opposite to the direction of the flow of exhaust gases, is therefore in the forward direction.

It will be understood that while the present invention has been described in terms of the preferred embodiment, it may take on any number of other forms while remaining within the scope and intent of the invention.

We claim:

1. A thrust vectoring apparatus for directing exhaust flow of the nozzle comprising:
    top and bottom divergent flaps, a set of corresponding right hand and left hand deflector flaps hinged to each of said divergent flaps so that each deflector flap of said set is rotatable about a corresponding line essentially on the flow surface of said divergent flap and wherein the corresponding lines on each of said flaps are angled with respect to each other, and
    means for deploying said deflector flaps into and at an angle to the direction of the exhaust flow.

2. The thrust vectoring apparatus of claim 1 wherein said right hand and left hand deflector flaps are disposed in mirror image fashion with respect to each other.

3. The thrust vectoring apparatus of claim 1 wherein said deflector flaps are:
    quadrilateral shaped deflector flaps.

4. A thrust vectoring two dimensional convergent divergent nozzle comprising:
    top and bottom convergent flaps,
    top and bottom divergent flaps pivotably connected to their respective convergent flaps,
    left hand and right hand sidewalls disposed outside of and generally perpendicular to and in flow sealing and slideable engagement with said flaps,
    at least four deflector flaps wherein each of said deflector flaps is mounted on either a left or a right hand half of one of said divergent flaps and such that each of said divergent flaps includes a right hand and a left hand deflector flap, wherein each of said deflector flaps is hinged to the nozzle so that it is rotatable about a corresponding line essentially on the flow surface of its respective divergent flap half, wherein the right and left hand corresponding lines on each of said divergent flaps are angled with respect to each other, and a means for deploying said deflector flap into the flow such that the flap's flow deflecting surface faces the center of the exhaust flow at an acute angle to the direction of the exhaust flow.

5. The nozzle of claim 4 comprising: a means to vary the area of the throat.

6. The nozzle of claim 4 wherein said right hand and left hand deflector flaps are disposed in mirror image fashion with respect to each other.

7. The nozzle of claim 6 wherein said deflector flaps are quadrilateral shaped.

* * * * *